(12) United States Patent
Severson

(10) Patent No.: US 8,131,460 B2
(45) Date of Patent: Mar. 6, 2012

(54) GPS NAVIGATION CODE SYSTEM

(76) Inventor: Gary Severson, Franklin Lakes, NJ (US)

(*) Notice: Subject to any disclaimer, the term of this patent is extended or adjusted under 35 U.S.C. 154(b) by 0 days.

(21) Appl. No.: 13/066,407

(22) Filed: Apr. 14, 2011

(65) Prior Publication Data

US 2011/0196605 A1 Aug. 11, 2011

Related U.S. Application Data

(63) Continuation-in-part of application No. 12/313,585, filed on Nov. 21, 2008, now Pat. No. 7,953,552.

(51) Int. Cl.
*G01C 21/30* (2006.01)
*G08G 1/123* (2006.01)
*G01S 13/78* (2006.01)

(52) U.S. Cl. .......... 701/209; 701/202; 340/995.19; 342/46; 342/357.12

(58) Field of Classification Search .......... 701/200–226; 340/5.84, 460, 988–996; 342/57, 357.52, 342/357.55, 357.56, 357.57; 455/511, 563, 455/116, 67.7
See application file for complete search history.

(56) References Cited

U.S. PATENT DOCUMENTS

| | | | | |
|---|---|---|---|---|
| 5,765,123 | A | 6/1998 | Nimura et al. | 701/208 |
| 5,941,930 | A | 8/1999 | Morimoto et al. | 701/201 |
| 6,339,744 | B1 | 1/2002 | Hancock et al. | 701/201 |
| 6,597,983 | B2 * | 7/2003 | Hancock | 701/200 |
| 6,615,131 | B1 | 9/2003 | Rennard et al. | 701/200 |
| 6,654,683 | B2 | 11/2003 | Jin et al. | 701/207 |
| 7,103,472 | B2 | 9/2006 | Itabashi | 701/200 |
| 7,292,937 | B2 | 11/2007 | Kuroda et al. | 701/209 |
| 7,768,395 | B2 | 8/2010 | Gold | 340/359.2 |
| 7,953,552 | B2 | 5/2011 | Severson | 701/209 |
| 2003/0036842 | A1 * | 2/2003 | Hancock | 701/200 |
| 2005/0021341 | A1 * | 1/2005 | Matsubara et al. | 704/275 |
| 2007/0078598 | A1 * | 4/2007 | Watanabe et al. | 701/211 |
| 2008/0113647 | A1 * | 5/2008 | Czajkowski et al. | 455/407 |
| 2008/0133124 | A1 | 6/2008 | Sarkeshik | 701/201 |
| 2008/0222127 | A1 * | 9/2008 | Bergin | 707/5 |
| 2008/0263095 | A1 * | 10/2008 | Porter, III | 707/104.1 |
| 2010/0312469 | A1 | 12/2010 | Chen | 701/207 |

OTHER PUBLICATIONS

"Magellan Does the Dash Thing: Maestro Elite 5340 Connected GPS with Google Local Search to Feature Unparalleled Ease of Use with One Touch Acess to User Favorites," @ http://gizmodo.com/341113/magellan-does-the-dash-thing-maestro-elite-5340%252Bgprs-connected-gps-with-google-local-search, Las Vegas Jan. 6, 2008.

* cited by examiner

*Primary Examiner* — James Trammell
*Assistant Examiner* — Muhammad Shafi
(74) *Attorney, Agent, or Firm* — Ernest D. Buff; Ernest D. Buff Assoc.; Dave Narasimhan

(57) ABSTRACT

A GPS navigation code device has GPS features and easy address retrieval means built in, enabling a driver to retrieve and request directions to an address without taking his eyes off the road. The user pre-programs the GPS navigation code device with a plurality of addressees or points of interest and assigns unique navigation codes for each as keyboard entry and speech, all stored in local database within the GPS in three linked databases. While driving, the user presses a special address search mode key and inputs the unique navigation code by keyboard or speech pattern, views displayed address and accepts the same. When an unknown navigation code is entered the GPS accesses a remote database through the Internet to recover the associated company name and uses Internet based map service to locate closest list of specified business providing directions by map and speech on a turn-by-turn basis.

14 Claims, 1 Drawing Sheet

GPS NAVIGATION CODE SYSTEM

This is a Continuation-In-Part of application Ser. No. 12/313,585, Filed Nov. 21, 2008 now U.S. Pat. No. 7,953,552 for "GPS NAVIGATION CODE SYSTEM", the disclosure of which is hereby incorporated in its entirety by reference thereto.

BACKGROUND OF THE INVENTION

1. Field of the Invention

The present invention relates to a GPS/navigation system having residential or address search requests; and more particularly, to a system wherein residential or search requests are accomplished by through entry of unique, short minimal keystrokes involving unique navigation codes instead of lengthy address information, such as street name, street address, city and state.

2. Description of the Prior Art

A number of GPS systems with various functionalities are known. These GPS systems generally require manual entry of address or business names for requesting driving direction instructions. Such manual entry requires numerous key strokes, making data entry hazardous unless the car is parked.

U.S. Pat. No. 5,765,123 to Nimura et al. discloses a navigation system. The user inputs a telephone number followed by selecting a point in a map that is displayed. The navigation system then directs the user to the selected map location, using GPS. The association between the telephone number and the map location is stored in a CD ROM or floppy disk. Entering a telephone number requires inputting at least ten numbers. Such activity is complicated, and would likely require a driver/user to take his or her eyes off the road.

U.S. Pat. No. 5,941,930 to Morimoto et al. discloses a navigation system. This navigation system includes input means for entering a telephone number and user selected map location, an information storage device for storing telephone-number data, in which a location name inclusive of a set of coordinates is stored for each telephone number. Address data in which an address is stored for each set of coordinates and map data. A central processor has retrieval means for telephone-number, location coordinates and location name, which correspond to a telephone number entered, and display means for displaying (i) a map centered on the location and (ii) direction instructions for the location name retrieved by the central processor. This navigation system requires entry of a telephone number and retrieved corresponding address for the navigation system to compute directions. This amount of entry of information of a telephone number and map location is cumbersome for the driver on the road. It requires the driver to look away from the road and focus on the data entry process, which presents a dangerous driving condition.

U.S. Pat. Nos. 6,339,744 and 6,597,983 to Hancock et al. disclose a geographic location referencing system and method. This system defines a grid and proprietary addresses of selected locations within a geographical area. It is characterized in that the grid addresses are defined in relation to a grid and can be easily converted to global coordinates defined in relation to a known global referencing system, and the proprietary addresses are unique to the geographical area. The second patent relates to providing a geographical identifier for a multiple listing service involving real estate properties. This system uses GPS or manual entry to determine the starting location and uses a previously assigned district and locational grid to provide a routing map for a specific location that is progressively stored in a database. This system requires manual inputs of various data, which are lengthy and cause the user to take his or her eyes off the road.

U.S. Pat. No. 6,615,131 to Rennard, et al. discloses a method and system for an efficient operating environment in a real-time navigation system. The enhanced operating environment is provided by improving input and output techniques in a navigation system. This method for reduces the number of inputs to a navigational system through a wireless device and the input methods include methods for entering non-deterministic information to retrieve deterministic information. Also disclosed are improved output techniques including methods for pacing navigational prompts provided by a navigation system. The invention is applicable to text, graphics or audible navigation systems. The input to the system is from a wireless device such as a cellular telephone, satellite telephone, wireless Personal Digital Assistant (PDA), personal computer or other suitable device having wireless communications capability. The wireless device connects through the Internet to a server as shown in FIGS. 1 and 2 and the server recognizes the user location and plans a route to the desired location at the server level, and a route map is delivered to the user. The '131 system is not a GPS navigation system and the user does not directly type into a GPS navigation system using a hardware or software generated keyboard or speak to the system contracted code representing a particular address or business destination.

U.S. Pat. No. 6,654,683 to Jin, et al. discloses a method and system for real-time navigation using mobile telephones. This Interactive Real-Time Distributed Navigation system is a method and system for implementing a warm start/cold start option. Through selection of the warm start option, an interactive session for providing navigational directions to a user is more quickly established because a user's position is assumed not to be ambiguous. A method of the invention verifies this assumption. Through selection of the cold start option, the method seeks to remove ambiguity in a user's position before providing navigational directions. If, however, a user's position is not ambiguous, the method of the invention reverts to a warm start condition to immediately transmit navigational directions to the user. The user location is determined by a series of servers located along a commonly driven preplanned route and these servers communicate interactively with the mobile telephone with limited computational power. The user sends a request to navigate from a current location (or point A) to point B. A server, after receiving the request (including destination information) and user's location, the system generates a global navigation route across several small geographic areas. The server then sends navigational information relating to a first small geographic area to the user's device. Once the user moves out of the first small geographical area, the information will be updated by the server either at the request of the user's device or initiated by the server based upon the location of the user. Not disclosed is a GPS navigation system that uses a navigator with additional function of correlating to addresses or specific business locations using an easy to input 3 or four letter code that reliably programs the navigator to direct the user to desired destination.

U.S. Pat. No. 7,103,472 to Itabashi discloses an information terminal apparatus, a navigation system, an information processing method, and a computer program. A configuration is provided which allows users, such as children, who cannot sufficiently read map information to easily perform positional confirmation. An information terminal apparatus carried on a user includes an image data storage block storing actually taken image data of two or more geographical points in an area in which positional information is to be provided and a positional information database storing the correlation data between the identifiers of image data stored in the image data storage block and the positional information. On the basis of the positional information obtained from a positional information capture block, the image data identifier corresponding to the positional information is obtained from the positional information database. The actually taken image data are obtained from the image data storage block based on the obtained image data identifier, and the obtained actually taken image data are displayed on a display block. This novel configuration allows the user to instantly determine the actually taken video, which matches the surrounding view for easy positional confirmation. Instead of providing maps that may not be easily followed by children, the '472 system displays two dimensional or three dimensional images on locations during route and at final destination for location recognition. The system does not utilize GPS, but instead relies on stored image data communicated to the device through the Internet from a server. The method of selection of a final destination and the ease of this procedure is not indicated.

U.S. Pat. No. 7,292,937 to Kuroda et al. discloses a navigation system, data server, traveling route establishing method and information providing method. This navigation system is a portable information processing device. The device has a control program, data server, information processing server, navigation method, traveling route establishing method, information providing method, and area information providing method. This system uses units in a vehicle, which scan a map code or bar code. The information is transmitted to a data server, which converts the scanned data to area information and communicates the area information to the vehicle on-board navigator. The user does not enter anything into the navigator; but instead relies on this complex process of scanning bar codes and map codes. The bar codes and map codes may not be present for every address and points of interest.

U.S. Pat. No. 7,768,395 to Gold discloses brand mapping. The user uses a portable electronic device to select an image representative of a brand. In response to the user's selection of the image representative of the brand, the device automatically presents the user with an image of a map that indicates a current location of the device and shows one or more images representative of brand purchase sites where the selected brand may be accessed by the user. The first location of the user electronic device is acquired independently of any location-specifying input provided by the user to the device. The device displays the image of a brand and user selects the image of the first branded entity The device identifies a first brand access site at which a first branded entity is accessible and provides to the user, using the device, a first map image which describes a first geographic area derived from the first location of the device. The indication in the device includes the image of the first branded entity along with a second image which may be a logo or a photograph or other representation of the product. The '395 patent discloses an image based selection procedure for locating a merchant that sells a selected brand product. The device disclosed by the '395 patent does not take the user to an address or a business site that is closest to the current GPS navigator system location.

U.S. Patent Application 2008/0133124 to Sarkeshik discloses location codes for destination routing. This method is for identifying particular geographic locations by means other than the postal address for use in navigation system and navigation, routing and mapping programs. The method may be the assignment of a series of numbers, symbols or characters, or a combination thereof, to a particular entity, location or address within a defined parameter. The address and location information is coded by the user into a series of alphanumeric and special characters. The user needs to enter into the main system both the starting location code and the destination code. The navigation unit may not have a GPS and the direction is determined from software resident in the device. Because of these features, the device is not a GPS navigator at all times and the GPS unit does not map the route from a present location to a destination location.

U.S. Patent Application 2010/0312469 to Chen discloses navigation system with a speech processing mechanism and method of operation thereof. In operation of the navigation system, a single utterance of a spoken input is received into a cell phone as shown in FIGS. 1 through 6. The spoken word is received by a server through Internet analysis of the spoken word with a region language model based on a sub-region grammar search to generate a search region from the spoken input. A location identifier and the search region are generated and displayed on a device. The location identifier interprets the spoken input as an address, an intersection, a point of interest, a listing, or a route. The term "navigation routing information" referred to in the '469 patent application is defined as the routing information described as well as information relating to points of interest to the user, such as local business, hours of businesses, types of businesses, advertised specials, traffic information, maps, local events, and nearby community or personal information. As indicated in FIG. 5 of the '469 patent application, the device requires multitudes of words to be spoken. These words are typically in the form of a sentence, such as "Gas station near Matilda and El Camino". Moreover, the address selected by the remote server is not verified or accepted by the user. The device of the '469 patent application is not a stand alone GPS navigation system that is capable of identifying an address or selected business location based on a contracted code delivered to the GPS navigation system by short key strokes or spoken word.

Non Patent Published Literature "Magellan Does the Dash Thing: Maestro Elite 5340 Connected GPS with Google Local Search to Feature Unparalleled Ease of Use with One Touch Access to User Favorites"@http://gizmodo.com/341113/magellan-does-the-dash-thing-maestro-elite-5340%252Bgprs-connected-gps-with-google-local-search discloses a navigation system that is integrated with Google Local Search. LAS VEGAS—Jan. 6, 2008—Magellan, the world's fastest-growing GPS brand, today premiered its Maestro Elite 5340+GPRS connected auto navigation unit featuring Google Local Search that enables users to get deep, location-specific information on the go. Scheduled to ship in Q1 2008, the Magellan Maestro Elite 5340+GPRS will be the first GPS model to enable users to search for local events—from concerts to local library events—as well as local businesses and services. Magellan will be showcasing its new products in its booth at the 2008 Consumer Electronics Show booth (no. 31247) beginning Monday, Jan. 7, 2008. Accessible on the Maestro Elite 5340+GPRS connected navigation device is Google's real-time local search enabling users to search the Web for businesses in a specific neighborhood, providing detailed, Internet-based information about those businesses—not just the business name or category. For example, users can search for "Star Wars" and find "Target" and "JPM Comics," among others, or get recommendations for the best banana cream pie near their point of reference. Users simply type in what it is they are looking for and Google displays relevant results around the user's current location or a user-specified location. Through the new Maestro Elite 5340's wireless GPRS connection, Magellan also delivers real-time traffic information, local weather forecasts, and makes it possible for users to wirelessly send addresses and notes to the GPS device directly from a PC with an Internet connection. The user can send destination addresses to the Maestro Elite 5340+GPRS in advance of the trip or have someone at home or back in the office send information from the Magellan website directly. The Magellan Maestro Elite 5340+GPRS is the company's premiere GPS model. Like all of the newly introduced Elite models, it provides rendered 3-D landmarks and buildings; 6 million points of interest (POI); a USB port; and advanced voice command functionality. The Maestro Elite 5340+GPRS also features a 5-inch WQVGA widescreen; a 533 MHz S-Media 3362 processor; and the ability to perform deep searches on local areas and receive information sent from a PC for on-the-fly changes. This publication discloses an Internet enabled Google Live Search device. This device does not provide easy entry of destinations for the driver without taking his or her eyes off the road.

Notwithstanding the efforts of prior art workers to provide improvements to a GPS system, there is clearly a need for a GPS system that enables the driver to enter direction requests from a current location to a desired residential or business address with minimal typing of data. Such a GPS device would significantly reduce the time during which the driver diverts his focus from the roadway. A GPS device that allowed data entry with minimal keystrokes would increase the margin of safety during driving and reduce accidents.

SUMMARY OF THE INVENTION

The present invention relates to a GPS/navigation system utilizing navigation codes to correlate with residential and business addresses, codes being stored and accessed from a remote database in combination with a local database. Each of these unique navigation codes is correlated with a residential and business address. The codes, with their correlating addresses, are stored in a database accessible to the GPS/navigation system. The remote or local database communicates with a GPS system or navigation system so that when a user inputs a navigation code into the GPS system, the address appears on the system and directions to the address are displayed. Generally stated, the invention is directed navigation codes/GPS codes that correlate to any address, so that when a navigation code is entered into a navigation or GPS system, directions to the correlating address are displayed by the navigation system. The GPS Navigation Code System broadly comprises: (i) a plurality of addresses and points of interest, each correlated with a unique navigation code; (ii) a database for collecting said addresses and said unique navigation codes present remotely in combination with a local database and correlating and storing each of said addresses with said unique navigation code; and (iii) the remote database in combination with local database being in communication with a GPS system or navigation system so that upon entry of the unique navigation code into the GPS system, the address appears on the system and navigation directions are displayed by the GPS Navigation Code System monitor. The user may also provide the navigation code entry by speaking to the GPS navigation code system instead of typing the data of the navigation code using the keyboard. The address, navigation code and recorded speech pattern may be reassigned, rerecorded or entirely erased and rerecorded prior to driving on a trip.

Several of currently available smart cell phones and personal data assistants (PDAs) have GPS navigation facility along with Internet connectivity, an address database, voice recognition and speech capabilities built-in within the device. The present invention as described herein may be effectively implemented in a smart cell phone or PDA with capabilities indicated above. The local database stores contracted codes, addresses as well spoken speech patterns. When a short phase, preferably is less than 10 characters, is entered or spoken after pressing a special key, the local database is accessed to find the address for feeding the address to the GPS navigation part of the smart cell phone or PDA. In the event the local database within the smart cell phone or PDA does not contain a suitable record, the smart cell phone or PDA connects to the Internet accessing the remote data base to find the full name that corresponds to the contracted code provided. The full name is searched in an Internet mapping software to locate locations of businesses that correspond to the contracted code provided that are in the close neighborhood of the smart cell phone or PDA current location. The GPS navigation system then provides driving instructions according to a chosen location of the business.

In its preferred embodiment, the GPS Navigation Code System of the present invention comprises:
i) a GPS navigation device with a local database, display, memory, a processor, software generated or hardware data entry keyboard, sound input and sound output;
ii) said GPS navigation device being programmed by a user using software generated or hardware data entry keyboard or spoken speech to record various addresses and points of interest;
iii) said user assigning a set of short keystrokes up to ten characters of contracted navigation code reference to each of the addresses and points of interest;
iv) said user recording a speech pattern of sounds for each of the navigational codes for each of the addresses and points of interest;
v) said GPS navigation device storing in a local database information collected and linking said addresses, points of interest, contracted navigational code reference and speech pattern of sounds in three linked separate databases;
vi) at any time, the user pressing a special key on the GPS navigation device to thereby set the device in address search mode, whereupon a desired address is retrieved from the stored local database and displayed in the monitor when the user types few characters on the software generated or data entry keyboard or speaks the previously assigned speech pattern of sounds;
vii) said user accepting the displayed address by pressing a special key and canceling the address search mode of said GPS navigation device;
viii) said GPS navigation system being operative in response to communication of a contracted navigation code that is not present in the local database therewithin to access the Internet, connecting to a remote database containing advertised contracted navigation codes and names of specific businesses;
ix) the GPS navigation system being further operative to access a GPS internal map or Internet map services, using current location information of the GPS navigation system and a full business name corresponding to the contracted code by accessing address data for specific businesses locations to provide the user with a list of close by business locations as well as distances thereto;
x) said GPS navigation device calculating the route to the desired address selected by the user and displaying the route on the display as well as providing voice generated guidance;

whereby the user after pressing the special key on the GPS navigator device spends a shorter time, entering fewer navigational code characters or speaking the previously assigned speech pattern, when retrieving the destination address, thereby avoiding distractions from vehicular driving duties, increasing the margin of safety for the driver, passengers and others in the vicinity of the vehicle.

BRIEF DESCRIPTION OF THE DRAWINGS

The invention will be more fully understood and further advantages will become apparent when reference is made to the following detailed description of the preferred embodiments of the invention and the accompanying drawing, in which.

DETAILED DESCRIPTION OF THE INVENTION

Figure 1:
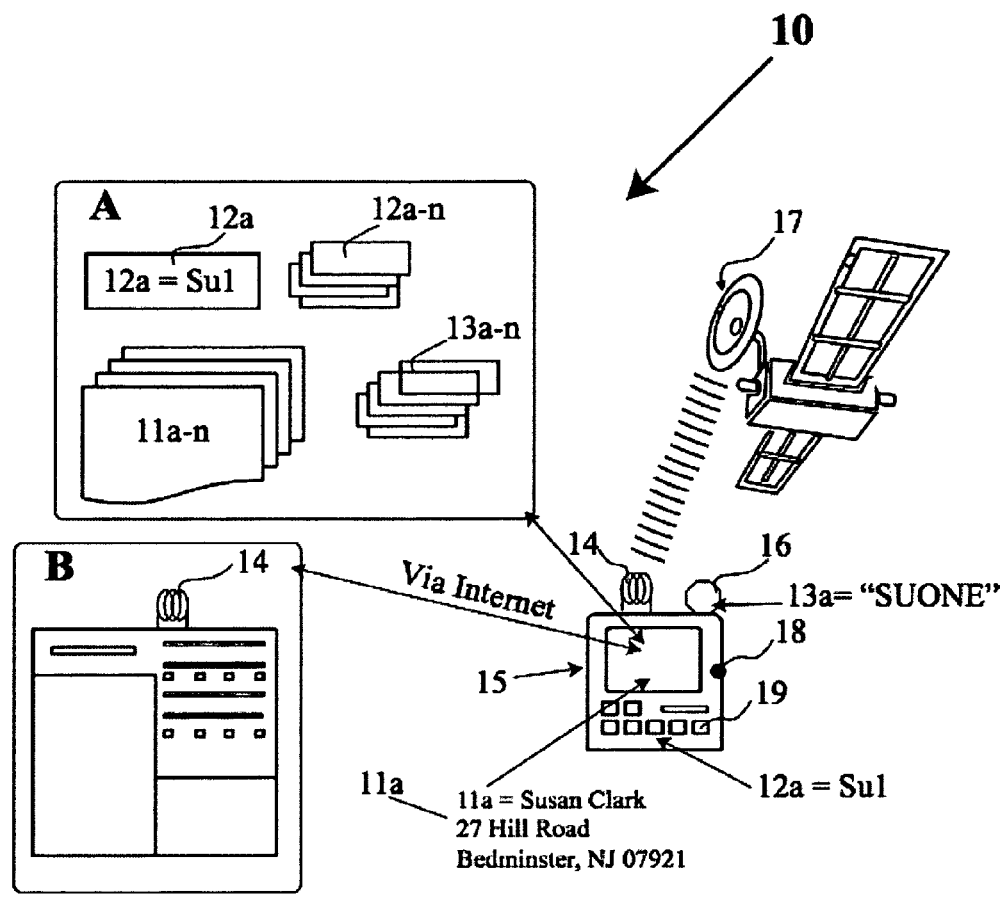
FIG. 1 illustrates a schematic overview of the GPS Navigation Code System.

Use of navigation through global positioning systems (GPS) has become instrumental in both the private and the public sector. More and more vehicles are equipped with these systems and, when not provided through the manufacturer of the vehicle, consumers can readily purchase portable systems appointed to be mounted within their vehicle. Currently, navigation address entry requires many keystrokes, which activity is not readily carried out in a safe, time efficient manner, especially when the vehicle is in motion. There exists a need in the art for a set of codes that uniquely identify any address so that a user can simply enter the unique identifier code that correlates with the address to be mapped, thereby avoiding the need for cumbersome, time consuming and oftentimes distracting typing procedures otherwise required to effect entry of the address into the system. The GPS Navigation Code System of the present invention solves this problem by associating unique navigation code identifiers with each address or points of interest so that entry into the GPS system is accomplished using a minimum number of keystrokes or by speech, with minimum attention diverted from driving during data entry.

This invention relates to navigation codes/GPS codes that correlate to any address. One of these navigation codes is entered into or spoken into a navigation or GPS system. After pressing a request button, the system shows the name and address of the selected destination retrieved from remote or local database, which is confirmed when the user presses the request button. The system calculates directions to the correlating address from the current location and displays the directions in the GPS Navigation Code System monitor. The GPS Navigation Code System broadly comprises: (i) a plurality of addresses, each correlated with a unique navigation code, which are previously entered through software generated or hardware keyboard or communicated by speech; (ii) a database for collecting said addresses, points of interest and said unique navigation codes, and correlating and storing each of said addresses with said unique navigation code; and (iii) the database which may be a remote or local database, being in communication with a GPS Navigation Code System so that upon entry of the unique navigation code into the GPS system the address appears on the monitor and navigation directions are displayed by the GPS Navigation Code System monitor.

Generally stated, the invention comprises a GPS navigation system that has a display, preferably an LCD display, memory, preferably both ROM for the software needed to drive the GPS navigator device and RAM to store user entered addresses, contracted references and speech patterns assigned to each of the plurality of addresses. The GPS navigation device has a processor which processes the address data, as well as a corresponding navigation code for each address, entered through keyboard or provided as speech recorded through a microphone, for storage in three separate linked databases within the device. This database collection may be a combination of local database collection in combination with a remote database accessed through the Internet. This link between entries allows the retrieval of the address upon keyboard entry of a small number of characters, or previously assigned speech pattern, of the navigation code. In order to enter into this search pattern, a special key is pressed in the GPS navigator device and the retrieved addressed is accepted by the user by pressing the special key. The retrieved address is passed to the GPS navigator processor and the device computes the route from the present location to the address recovered. The user may be provided with the usual options, including: 'shortest time', 'shortest distance', 'use mostly freeways' and 'avoid freeways'. The display shows the map, and voice generated instructions guide the user on a turn-by-turn basis, directing the user to the retrieved address from the present location.

The correlation between the local database and remote database may have different combinations of features. The local database stores any combination of three or four letter keystrokes and speech pattern that is associated with a specific address or point of interest. The remote database accessible through the Internet may contain public addressable universal three or four letter codes that point to specific businesses, the keyword defined by individual businesses. For example, a McDonalds franchise could advertise the use of a specific reference code such as "MDL" (which they would purchase from the site administrator or other representative for the remote database). When the user enters this code into the GPS navigation system for the first time, it searches the local database to determine if this code exists. In the event that the code is not present, the GPS navigation system accesses the remote Internet database to find the name of the business associated with the reference code and stores this data within the database. Thus, points of interest not entered into the system by the user, but which are present in a remote public Internet based database, are uniquely available to the user upon entry of the publicly advertised three or four letter reference code. When the user enters the reference code, such as "MDL", and the internal database within the GPS navigation does not have the specific reference code, the GPS navigation system accesses the Internet connection to the remote data base that has a collection of subscribed contracted codes and names of businesses. The GPS navigation system at this point may access its internal map database to locate the locations of the business corresponding to the reference code and display the results to the user, requiring the user to select a particular choice for the business location, and provide a driving direction map as well as guidance through speech. If the internal map of the GPS navigation map does not have the specific business listed by name within the database, the GPS navigation unit accesses and searches Google Maps or other Internet based programs to identify the businesses associated with the reference code which are geographically closest to the current location of the vehicle housing the GPS navigator; this identifying process takes place in real time as the vehicle is traveling. The number of selections displayed will vary depending on the location of the vehicle and the density of business sites therewithin. Typically there are displayed up to 5 selections situated within a 25 mile radius of the vehicle. In the event that no business site is within the radius of interest, the system will display the closest site identified. The user is thereby presented with a list of McDonalds locations, which are displayed on the system monitor together with the distances thereto. From these displayed McDonalds locations, the user can readily choose the location, which is nearest and/or most desirable for his purposes.

The GPS navigation device may be a smart cell phone or a personal data assistant (PDA) which already has a database capability, voice recognition and speech capability as well as Internet connectivity and GPS capability. All that is required is to add software features for creating a local database as detailed herein and ability to connect to remote database using Internet connectivity, parsing the data to acquire the full company name and search Internet mapping software using the full name of the party that correspond to the contracted code typed or spoken to find business locations in the close neighborhood of the smart cell phone or PDA current location. The GPS navigation system then provides driving instructions according to a chosen location of the business.

FIG. 1 illustrates a schematic overview of the GPS Navigation Code System, shown generally at 10. The GPS Navigation Code System 10 broadly comprises GPS navigation device 15 with a local database A that has a plurality of addresses 11a-n each correlated with a unique contracted reference navigation code 12a-n. Such code 12 a-n typically has three or four letters and previously assigned sound patterns 13a-n of the assigned three or four letter reference code, which are stored in a local database A. Address 11a is correlated with unique contracted reference navigation code 12a and assigned speech pattern 13a. Database A also collects addresses of points of interest 11a-n, unique contracted reference navigation codes 12a-n and assigned speech patterns 13a-n in three linked separate databases and correlates the same. The local database A is in communication with a GPS system 15 or navigation system so that when a user enters the unique navigation code 12a-n (12a) using software generated or hardware keyboard or speaks the stored navigation code (13a) into their vehicle/personal GPS 15, the address 11a-n (11a) appears on the system 15 and navigation directions are yielded to the user. Each of the addresses 11a-n and any latitude or longitude coordinate, such as points of interest, camp grounds, etc., will be assigned a code or unique contracted reference navigation code 12a-n, as well as speech patterns 13a-n. In operation, all the user has to do is communicate the unique contracted reference navigation code 12a . . . b, c . . . -n, generally consisting of a sequence of letters and/numbers, for example, as shown at 12a, Sul, into their system 10, or speak the speech pattern into microphone 16, and the system will calculate and yield directions to the correlating address 12a . . . b, c . . . -n.

The user may enter a contracted reference code that was provided by a business in their advertisements as a marketing tool, to encourage the user to come to their location. When the user enters the three or four letter advertised contracted reference code, using a hardware keyboard or software generated keyboard that communicates using speech recognition, the system first searches the local database to verify if this code is present. In the event that the code is present, the system immediately identifies and displays the business or person correlated therewith, together with logistical information, such as contact information and distance to the business or residence of the code bearing party. In the absence of the code, the GPS navigation system contacts the Internet using the same antenna that communicates with the GPS satellite, or a different antenna, and thereby reaches a special remote database B, which is accessible through the Internet at a special web address and contains all the company names and their corresponding contracted three or four letter codes. The GPS navigation system now collects the company name that corresponds to the contracted code and stores the information in the local database for future use. Next, the GPS navigation system uses its internal map searching for business name to provide business locations close to the GPS navigation system within a moving vehicle and presents the list along with distance to the location so that the user may select a desired location. If the internal database of the GPS navigation system does not have the business name within the database contained therein, the GPS navigation system contacts Internet based map systems such as Google Maps to find locations of businesses associated with a name corresponding to the code just acquired, and provide to Google Map the current location of the vehicle wherein the GPS navigation system resides. The Google Map Internet program displays the nearest business having the specified contracted reference code together with contact information for each location of the business and the travel distance required to reach it. The user is thereby presented with a displayed list of possible locations along with distances required to reach them. A particular business location to visit is selected, and the GPS navigation system provides directions thereto in the usual way. The remote database B is maintained by the operator or other representative of the system that provides GPS Navigation of the kind contemplated in this invention and has contracted navigation codes and names of the businesses. Companies and third parties pay a fee to contract for this service, which represents an effective marketing tool for the businesses and a useful networking mechanism for non-commercial parties. Once a user triggers a "look up" for a certain business using the remote access database B, the resultant data is stored in the local database A. Thereafter, when using the contracted navigation code, the GPS navigation system can search for the business from any location of a vehicle using the GPS navigation system internal map or Internet mapping software. Such a search is readily carried out without having to access Internet based remote database B, since the contracted code and business or third party name are already stored within the internal database of the GPS navigation system.

Data regarding location of the party closest to the vehicle housing the GPS Navigation code system can be derived from Internet mapping software by pressing the special key and holding it in the "pressed condition" for a preselected period of time, such as a time period ranging from about 1 to about 5 seconds. This procedure re-triggers a "look up" for the party in the remote access database B bearing the contracted navigation code requested, and obtains the expanded name of the party. Next, the address data is acquired from Internet mapping software instead of from the GPS navigation system internal map. Conflicts involving directions provided by the Internet mapping software and the GPS navigation system's internal map can thereby be resolved to improve the accuracy of directions associated with a party bearing the contracted navigation code requested.

The system GPS 15 receives data from satellites 17. Thus, the process for entering addresses or speaking into a microphone in accordance with a previously assigned speech pattern in the GPS navigation system is dramatically simplified and thereby converted to a much more efficient process. The address search mode is activated by pressing a special key 18, shown in this case as a button and entering the unique navigation code through keyboard 19 or speaking into the microphone 16, at which point, the monitor displays the address. The user accepts the address by pressing the special key 18 and canceling the address retrieval mode and the GPS Navigation Code device calculates the direction to the selected address from the present location of the vehicle wherein it resides.

FIG. 1 also illustrates the details of the GPS navigation code device. Generally stated, the GPS navigation code device has an antenna 14, a microphone 16, a keyboard 19 and a special key, shown as a button at 18. When the special key 18 is pressed by the user, the GPS navigation code device enters the address search mode and waits for the user's keyboard input for the navigation code or previously recorded speech patterns through microphone 16. Upon receipt of the navigation code, the device retrieves the address and displays the address on the monitor. The user accepts the address by pressing the special key again, returning the GPS navigation code unit to seek direction to the selected address from the current location. The direction is indicated on the monitor and turn-by-turn direction instruction is provided by voice guidance.

The GPS navigation device communicates with the GPS satellite using the antenna 14. In the FIGURE shown, the same antenna is used to communicate with the Internet for accessing Internet based remote database B or to access Google maps. The remote server B is also provided with antenna 14 for Internet connection; this may be a hard wired connection.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A GPS Navigation Code System comprising:
   a. an Internet based remote database of advertised addresses and points of interest, corresponding to contracted navigational codes, and a GPS navigation device having Internet connectivity, a local database, an internal map database, display monitor, memory, processor, software generated or hardware data entry keyboard, sound input, sound output and a special key for activating address search;
   b. said GPS navigation device local database including user data of user generated various addresses and points of interest and a corresponding contracted navigation code reference to each of the addresses and points of interest;
   c. said GPS navigation device local database including a speech pattern of sounds for each of the contracted navigational codes for each of the addresses and points of interest;
   d. said GPS navigation device configured to store in said local database said addresses, points of interest, contracted navigational code reference and speech pattern of sounds in three linked separate databases;
   e. said special key being operative, upon being pressed, to thereby set the said GPS navigation device in address search mode, whereupon a desired address is retrieved from the stored local database and displayed on the monitor when a few characters are typed or spoken;
   f. said system being configured to accept the displayed address and to cancel the address search mode of said GPS navigation device by pressing the special key;
   g. said GPS navigation device being operative in response to communication of a contracted navigation code that is not present in the local database therewithin to access said Internet based remote database containing advertised contracted navigation codes and names of specific businesses;
   h. the GPS navigation device being further operative to provide current location information regarding the GPS navigation device to the GPS navigation system to accessed locations of specific businesses corresponding to contracted navigation codes and to provide a list of close by business locations for selection;
   i. said GPS navigation device configured to calculate the route to the address selected and to display the route on the display as well as to provide voice generated guidance using said internal map database;
   whereby pressing the special key on the GPS navigator device and input of a few navigational code characters through text or speech when retrieving the retrieves a destination address in a short time, thereby avoiding distractions from vehicular driving duties, increasing the margin of safety for the driver, passengers and others in the vicinity of the vehicle.

2. The GPS Navigation Code System as recited by claim 1, wherein said address is retrieved by either entering keystrokes of navigational codes or by speaking a speech pattern of sounds after activating address search mode by pressing said special key.

3. The GPS Navigation Code System as recited by claim 1, wherein the navigation code is a few keystrokes.

4. The GPS Navigation Code System as recited by claim 1, wherein the addresses and navigation codes in the local database are pre-programmed by the user prior to driving in an automobile.

5. The GPS Navigation Code System as recited by claim 1, wherein the addresses, navigation codes and voice recording in the local database may be individually changed and reassigned or entirely erased and reprogrammed prior to driving on a trip.

6. The GPS Navigation Code System as recited by claim 1, wherein said special key in the GPS navigation device is an easily accessible press button.

7. The GPS Navigation Code System as recited by claim 1, wherein said advertised contracted navigation codes and names of specific businesses are also stored in local database for future use.

8. The GPS Navigation Code System as recited by claim 3, wherein said navigation code comprises at least 2 keystrokes.

9. The GPS Navigation Code System as recited by claim 7, wherein said navigation code comprises from 2 to 10 keystrokes.

10. The GPS Navigation Code System as recited by claim 8, wherein said navigation code comprises from 4 to 8 keystrokes.

11. The GPS Navigation Code System as recited by claim 9, wherein said navigation code comprises from 5 to 7 keystrokes.

12. The GPS Navigation Code System as recited by claim 1, wherein the GPS navigation device is a smart cell phone with Internet connectivity.

13. The GPS Navigation Code System as recited by claim 1, wherein the GPS navigation device is a personal data assistant (PDA) with Internet connectivity.

14. A method of using a GPS Navigation Code System, comprising the steps of:
   a. programming the GPS navigation device that is a part of the GPS navigation system recording various addresses, points of interests and corresponding contracted navigational codes using software generated data or a hardware data entry keyboard generated data that is stored in a local database of said GPS navigation device;
   b. recording a speech pattern of sounds for each of the contracted navigational codes for each of the addresses and points of interest, and storing said speech pattern of sounds in a local database of said GPS navigation device;

c. pushing a special key in the GPS navigation device to set the device in address search mode and typing few characters or speaking said contracted navigation code to retrieve a desired address or point of interest;
d. accepting a retrieved address displayed by the said GPS navigation device by pressing said special key;
e. depression of the said special key when an address search of the local database does not retrieve a desired address or point of interest in response to entry of a contracted navigation code being operative to cause said GPS navigation device to establish an Internet communication that accesses an Internet based remote database containing advertised contracted navigation codes and names of specific businesses, to recover the address that is closest to the GPS Navigation device and appointed for acceptance; and f. said GPS navigation system calculating the route to the desired address selected and displaying the route on the display as well as providing voice generated guidance using said internal map database or an Internet based mapping resource;

whereby after pressing the special key on the GPS navigator device a shorter time is spent entering navigational code characters or speaking the previously assigned speech pattern, when retrieving the desired address, thereby avoiding distractions from vehicular driving duties, increasing the margin of safety for the driver passengers and others in the vicinity of the vehicle.

* * * * *